United States Patent [19]

Hiskens et al.

[11] 4,222,820
[45] Sep. 16, 1980

[54] PAPER SIZING AGENTS

[75] Inventors: Ian R. Hiskens; David C. Johnson; Michael J. Caudwell, all of Bristol, England

[73] Assignee: Tenneco Chemicals, Inc., Saddle Brook, N.J.

[21] Appl. No.: 917,629

[22] Filed: Jun. 21, 1978

[30] Foreign Application Priority Data

Jun. 28, 1977 [GB] United Kingdom ............... 27090/77

[51] Int. Cl.$^2$ .............................................. D21H 3/08
[52] U.S. Cl. .................................. 162/158; 106/213; 162/175; 260/346.74
[58] Field of Search ............................... 162/158, 175; 260/346.74; 106/213

[56] References Cited

U.S. PATENT DOCUMENTS 3,821,069  6/1974  Wurzburg ........................... 162/158
3,952,023  4/1976  Kaiya et al. ..................... 260/346.74

FOREIGN PATENT DOCUMENTS 500349  2/1939  United Kingdom ..................... 162/179

OTHER PUBLICATIONS

LaBarre, E. J., "A Dictionary of Paper and Paper-Making Terms, " 1937, p. 210.

Primary Examiner—William F. Smith
Attorney, Agent, or Firm—James P. Scullin

[57] ABSTRACT

A sizing agent for use in paper-making comprises an aqueous emulsion of at least one compound of the formulae

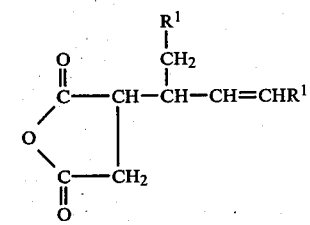

or

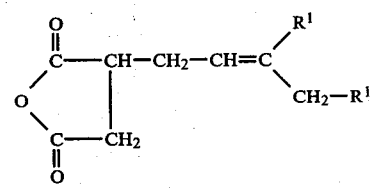

wherein each $R^1$ represents a hydrophobic group selected from alkyl, alkenyl, aralkyl or aralkenyl groups, where the $R^1$ groups in either formula may be the same or different and together they contain from 25 to 60 carbon atoms. The sizing agent can be used for either internal or surface sizing, and is effective in the absence of, or in the presence of, a retention aid.

29 Claims, No Drawings

PAPER SIZING AGENTS

This invention relates to the sizing of paper and is concerned, in particular, with improved paper sizing agents, processes for their preparation and processes for the manufacture of sized paper products employing such improved paper sizing agents.

In this specification, the term "paper" is used, for convenience, to mean all forms of paper, paperboard and related products whose manufacture involves the employment of a sizing agent upon cellulosic or other fibres, the sizing agent being employed in any of the customary ways, for instance by being added to the cellulosic or other fibre stock from which a web is later made or by being applied to the surface after the web has been formed.

For many years, paper sizing made use of materials, mainly rosin preparations, all of which depended for their sizing effect upon the formation of electrostatic types of bond between the sizing agent and the cellulosic or other fibres. In more recent times, sizing agents have been developed whose operation may also involve the formation of chemical bonds and these are known as "reactive" sizing agents.

It is now known that many sizing agents do not necessarily fall into one or other of these two types, even though they may provide adequate sizing. For instance, it may be established that one sizing agent operates largely by the formation of electrostatic bonds, whereas another sizing agent (which may be a very similar product) may operate largely by the formation of chemical bonds. One useful way of testing whether and, if so, to what extent a sizing agent is "reactive" is to effect acetone extraction of a sized paper sheet. If the sheet exhibits no significant difference in sizing, as measured for instance by the 1 minute Cobb test, before and after the extraction operation, this means that even so effective a solvent as acetone has failed to remove any of the sizing agent, which must therefore all be chemically bonded to the paper web. In such a case therefore, the sizing agent can correctly be regarded as reactive, whereas any significant difference in the degree of sizing of the paper sample after acetone extraction means that the sizing agent is operating to an appreciable extent by way of electrostatic bonding.

Accordingly, the term "reactive sizing agent" is not to be understood to imply that the product in question will always operate substantially only by reaction, i.e. by chemical bond formation, and the term is used herein in a way which appears to accord better with the practical situation which often applies, namely that a so-called "reactive" sizing agent will usually operate by chemical bond-formation to a large extent and will often operate substantially entirely in such manner. Most so-called "reactive sizing agents" are of one or other of two types, namely products based upon alkyl ketene dimers and products based upon substituted succinic anhydrides. The present invention relates to the latter type of sizing agent and provides improved preparations based upon succinic anhydride derivatives which are new and which have properties which render them especially and unexpectedly suitable for paper sizing purposes.

It is known that the practical employment of sizing agents of these kinds is dependent upon the preparation of the reaction product, e.g. the substituted long-chain succinic anhydride, in the form of an emulsion, typically in the form of minute particles, each surrounded by a stabilizing coating or layer of an emulsifying agent, for instance, a cationic starch. Each coated particle in an emulsion stabilized with a cationic agent thus carries a positive electrical charge and, in operation, the coated particle undergoes two changes upon contact with the fibres which are being made into paper, namely electrostatic discharge and chemical reaction of the reaction product with the hydroxyl groups present in the cellulosic or other fibres.

Many kinds of fortified, reactive and other sizing agents have been proposed in recent times which comprise succinic anhydride derivatives, or related compounds, e.g. glutaric anhydride derivatives. It had previously been discovered that products of improved sizing efficiency could be made by subjecting rosin and unsaturated compounds found in rosin to adduct-forming reactions of the Diels-Alder type, using various simple unsaturated organic acid anhydrides to react with resinates or other unsaturated rosin compounds. Maleic anhydride proved especially suitable for this purpose and the success of so-called "maleated rosin" sizing agents led to the investigation of the sizing efficiency of other reaction products of unsaturated compounds with maleic anhydride. It is well-known that maleic anhydride will undergo adduction with almost all unsaturated compounds which have a conjugated diene structure, but not all of the resultant products have properties which render them suitable for use as paper sizing agents. It is also well-known that maleic anhydride (and other unsaturated dicarboxylic acid anhydrides) will usually undergo a so-called "ene" reaction with compounds having ethylenic unsaturation and specifically the structure:

The Diels-Alder diene reaction involves ring formation with bond shift, whereas the ene reaction involves simple adduction, the ethylenic unsaturation then-moving to the next adjacent carbon-carbon bond.

G.B. Pat. No. 957,136 (equivalent to U.S. Pat. No. 3,102,064) discloses a class of substituted cyclic dicarboxylic acid anhydrides which can be prepared by the kinds of reaction just referred to, which include substituted succinic anhydrides, and these products are useful as sizing agents. The relevant compounds are stated to have the general formula:

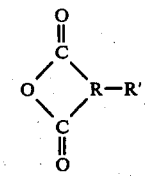

wherein R represents a dimethylene or trimethylene radical and wherein R' is a hydrophobic group containing more than 5 carbon atoms which may be selected from alkyl, alkenyl, and aralkenyl groups.

These prior sizing agents are substituted succinic and glutaric anhydrides which are made by reacting the appropriate unsaturated anhydride with a linear olefin, which has the olefinic double bond in the 1, 2 or 3-position and which can thus be classed as having terminal unsaturation, in view of the location of the double bond in relation to carbon chain length.

G.B. Pat. No. 1,409,830 (equivalent to U.S. Pat. No. 3,821,069) is a later disclosure which relates to succinic anhydride derivatives of the formula:

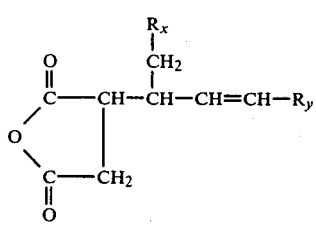

wherein $R_x$ is an alkyl radical containing at least 4 carbon atoms and $R_y$ is an alkyl radical containing at least four carbon atoms. The latter derivatives may be made by reacting maleic anhydride with one or more internal olefins of the formula:

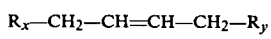

wherein $R_x$ and $R_y$ are as previously defined. The olefins preferably used contain from 14 to 22 carbon atoms, so that the sizing agents are based upon dicarboxylic acid anhydride derivatives containing 18 to 26 carbon atoms and having molecular weights ranging up to approximately 400.

The sizing agents disclosed in the aforementioned prior specifications are used by addition to the fibre stock from which the paper web is made. The products can be regarded as having medium carbon chain lengths, e.g. of up to 24 carbon atoms, and therefore of medium molecular weights.

It has now been discovered that reaction products of maleic anhydride and polybutadienes, obtained by reacting maleic anhydride with polymers of butadiene, preferably those which are liquids at room temperature are very useful as paper sizing agents. It has also been discovered, in contrast to the indications given in prior specifications, that useful reaction products are not restricted to those made from hydrophobic carbon-containing groups having terminal unsaturation or from linear olefins having mid-chain unsaturation and, furthermore, that sizing agents can be based upon reaction products with correspondingly higher molecular weights. Furthermore, it has been established that useful and effective sizing agents, whether or not they can be classed as wholly reactive in type, can be prepared which are effective in any mode of use and that great savings in equipment costs and other high cost factors can be made by virtue of the exceptionally good stability of sizing emulsions made by standard techniques from the reaction products of the present invention upon which are based the novel paper sizing agents disclosed below.

According to one aspect of this invention, a method of sizing paper is provided which comprises intimately dispersing within the wet pulp or, after conversion of the pulp into paper, treating the resultant web with a sizing agent which comprises an emulsion in an aqueous medium containing at least one compound selected from long-chain succinic anhydride derivatives of either or both the formulae:

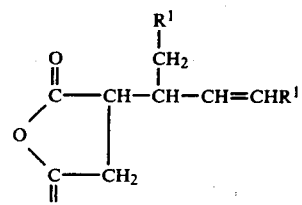

and

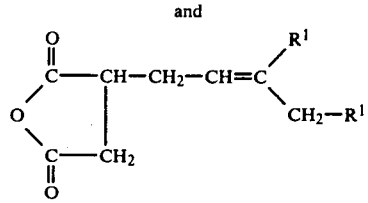

wherein each $R^1$ represents a hydrophobic group selected from alkyl, alkenyl, aralkyl or aralkenyl groups, where the $R^1$ groups in either formula may be the same or different and together they contain from 25 to 60 carbon atoms.

Examples of sizing agents typical of those employed in carrying out the sizing of paper according to this invention include those prepared from the reaction products of maleic anhydride with liquid polymers of butadiene, the latter having molecular weights in the range from 500–10,000 and, most preferably, in the range from 750–1500. These reaction products are long-chain succinic anhydride derivatives and are conveniently made by refluxing maleic anhydride with a selected liquid polymer of butadiene, using an inert atmosphere and a time period sufficient to achieve an adequate degree of reaction. Preferably, the molar ratio of the butadiene polymer to the maleic anhydride is from 1:0.95 upwards, i.e. not less than 9.3 g of maleic anhydride per 100 g of Lithene PL or pro rata. Also, the reaction product preferably is made from a polybutadiene of low or medium molecular weight and thus consists of succinic anhydride derivatives having a molecular weight typically in the range from 800 to 1400.

General methods for the preparation of reaction products of maleic anhydride and olefinic materials are known and are employable in order to manufacture reaction products for use as emulsions of sizing agents in accordance with this invention.

The commercial manufacture of butadienes usually is carried out either by a telomerisation process or by a so-called "living polymer" process, but in either case leads to mixed products which predominantly contain butadiene-1,2 and butadiene-1,4. On polymerisation, commercially-available butadienes therefore produce a range of mixed products containing differing amounts of vinyl-1,2, cis-1,4, trans-1,4 and cyclised structures, as follows:

Trans-1,4: 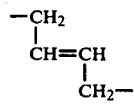

Cis-1,4: 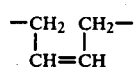

Vinyl-1,2: 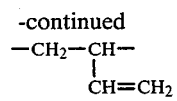

Cyclised structures:

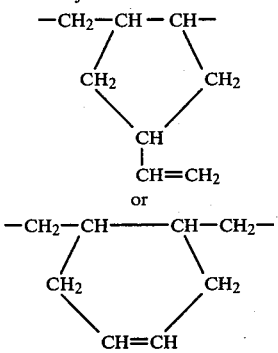

A wide range of butadiene polymers which are liquid at ordinary temperatures are available and it is naturally to be understood that as butadiene polymers themselves tend to be mixed products so also are reaction products made by maleinising such commercially-available polybutadienes themselves mixed products, where the stated ranges of molecular weights in practice represent average figures for the products concerned.

One range of such commercially-available polybutadienes are the materials marketed by Colorado Chemical Specialities Inc under the trade name "Ricon", while another commercially-available range of products are those marketed by Revertex Ltd under the trademark "Lithene". The grades of "Lithenes" available from Revertex have the following microstructures:

| Grade | 1,4 | 1,2 | Cyclised |
|---|---|---|---|
| Lithene A | 25% | 45% | 30% |
| Lithene N | 55% | 45% | — |
| Lithene P | 60% | 40% | — |
| Lithene P-4 | 75% | 25% | — |

Depending on the grade, low, medium and high viscosity materials (and therefore low, medium and high molecular weights) are available. The molecular weight range available varies between 500–10,000. The presence of high 1,4/low 1,2 favours low viscosity, whilst low 1,4/high 1,2 favours high polymer backbone unsaturation; the cyclised structure reduces overall unsaturation, reduces reactivity and gives harder polymers. (Reference is made to "Lithene Liquid Polymers of Butadiene", published by the distributors, and to J. Oil Col. Chem. Assoc., 1977, 60, 173–180, "Liquid Polybutadiene Resins for Surface Coatings", P. Aukett and A R Luxton, giving detailed information on the manufacture, properties and applications of "Lithenes"). In general, it appears that butadiene polymers wherein the 1,2 structure predominates are likely to prove unsuitable for use in the preparation of reaction products according to this invention. This characteristic possibly applies to the afore-mentioned commercially-available "Ricon" products as these have been found to be unusable within the context of this invention, owing to undesirable gel formation on reaction with maleic anhydride. Though many different polybutadiene materials are available and are suitable for carrying out the invention, as they can be used to make reaction products of the desired structure and properties, nevertheless it is advisable to investigate any selected polybutadiene material, to see whether it can be utilised in practice. The reaction between a butadiene polymer and maleic anhydride is exothermic and it has been found that the polymer high in the 1,2 structure and others may produce an exotherm which proves difficult or impossible to control and that under these conditions the reaction leads to gel-like products which are unusable for the manufacture of paper sizing agents. It is to be understood, therefore, that it is always advisable to establish first the nature of the exothermic reaction between maleic anhydride and a given polybutadiene and to avoid the use of any which lead to gel-like products.

Our work has been based mainly on Lithenes of the PM, PL and AL grades, representing the range of microstructures available at medium to low molecular weights, which can be regarded as ranging from 750 to 1500, made by the telomerisation technique.

Typical molecular weight data for the materials examined are:

| | |
|---|---|
| Lithene PL | 900 |
| Lithene PM | 1300 |
| Lithene AL | 900 |

The higher molecular weight materials in the range were not considered, mainly because of the viscosity of polymers in the molecular weight range from 1800–5400. However, the full molecular weight range indicated earlier is utilisable, since products of high viscosity are capable of modification to enable acceptable sizing agents to be produced, subject to the overriding consideration as to the unsuitability of highly-reactive polymers discussed above.

In addition to the A, P and P-4 series of Lithenes, the materials currently available include the N and N-4 series made by the "living polymer" technique and a product identified as Lithene PM25MA, which is a maleic anhydride adduct of Lithene PM, made from 100 parts by weight of the latter and 25 parts by weight of maleic anhydride; this approximates to 3.25 moles of maleic anhydride per mole of Lithene PM. Lithene PM25MA is stated to be more compatible with polar solvents and resins than other Lithenes (i.e., those which have not been maleinised) and to be the convertible, by half-esterification and neutralisation, to a water-soluble form. Lithene PM25MA is a higher viscosity liquid and its recommended application is in the form of aqueous solutions usable as binders for electropaints. No applications for Lithene PM25MA per se or as emulsions are disclosed in the available literature.

According to another aspect of this invention, a method is provided for the preparation of one or more of the long-chain succinic anhydride derivatives of the above formula I, which comprises reacting maleic anhydride with a liquid polymer of butadiene, typically in a molar ratio of not more than 2.0 or at most 2.5 moles of maleic anhydride per mole of polybutadiene and preferably in a molar ratio of polybutadiene to maleic anhydride in the range from 1:0.95 to 1:1.5.

As already indicated, one known class of so-called "reactive" sizing agents are those based upon ketene dimers; an example of such a sizing agent currently available as a commercial product is the ketene dimer material known as "Aquapel". This is a sizing agent which has excellent stability, which in part at least is due to its relatively slow rate of reaction. This advantageous stability is accompanied by a low reactivity characteristic, which means in practice that when "Aquapel" is employed as a sizing agent on a conventional paper machine it has not undergone a cure at the size press and is usually still partly uncured when the web has been taken off the machine. Sometimes, full cure of ketene dimer sizes is developed up to 24 hours after manufacture of the web. The other commercially-available "reactive" sizing agent, based upon long-chain succinic anhydride derivatives, in effect has stability and reactivity properties which are the reverse of those typical of ketene dimer sizes. A currently-available reactive size is the product marketed under the name "Fibran" which is believed to be of the kind disclosed in one or other of the above-mentioned prior patent specifications. "Fibran" has a rapid cure characteristic which is indicative of its reactivity, but this is accompanied by a high sensitivity to hydrolytic influences, as is to be expected. This high level of reactivity is an important characteristic of "Fibran", but this imposes severe conditions, because it is an oily material, which has to be emulsified for use and, as it has to be used very soon after manufacture, "Fibran" requires the provision of high-class emulsification equipment in the paper mill. The half-life of a "Fibran" emulsion (i.e. the time during which a sample loses half of its sizing effect through hydrolytic activity) is about 30 mins. Not only is expensive equipment necessary, but also this requires the presence of skilled paper-making personnel. A typical long-chain olefin with mid-chain unsaturation used for the manufacture of "Fibran" is hexadecene-9. This and related materials are relatively difficult and therefore expensive to make.

An object of the present invention is to seek effective sizing agents which have the desirable properties of existing products without the attendant disadvantages and, in particular, provide reaction products which, in addition to the self-evidently desirable characteristic of an effective and reproducible sizing performance, can also be readily made into stable emulsions of long half-life, require conventional emulsification equipment and systems, impose minimum requirements for the provision of special equipment and operating personnel in the paper mill, employ readily-available and inexpensive starting materials and, moreover, are fully compatible with conventional sizing agents. This last characteristic is desirable not only because it opens the way to simultaneous use of two or more sizing systems of different kinds, but also because it greatly simplifies change-over in the mill from one kind of sizing agent to another.

In order to achieve in a single sizing agent, the desirable combination of properties and characteristics listed above, therefore, it is proposed in accordance with the present invention to base sizing agents upon the reaction products of polybutadienes and maleic anhydride and the invention is predicated upon the discovery and establishment of the effectiveness of such reaction products and the optimum conditions for their preparation and use as sizing agents in accordance with this invention.

In order that the invention may be readily appreciated, the following Examples are given, relating to the preparation of polybutadiene/maleic anhydride reaction products, their use as surface and stock sizing agents and their comparison with a commercially-available sizing agent, namely the product comprising a succinic anhydride derivative made from a maleinised olefin reaction product and marketed by National Starch and Chemical Corporation under the trade name "Fibran".

In the Examples, percentages are expressed as "percentage total solids", i.e. the amount of sizing agent solids as a percentage of the dry weight of fibre (given as "% s/f" below) and the ratios of polybutadiene to maleic anhydride employed in making the reaction products of this invention are expressed in molar proportions so far as possible. The Examples are largely presented in the sequence in which various reaction products have been evaluated and modifications made in the conditions of preparation and use of the reaction products, in order to better demonstrate how the critical parameters and preferred features characterising the products and processes of the invention have been devised and in order to facilitate understanding and appreciation of those parameters and features. Though it might be considered that some of the results indicated below demonstrate poor sizing ability, the successful devising of practical sizing agents depends upon a number of factors and not only is it necessary to establish that a given reaction product has the ability to size but also a full evaluation of that reaction product involves establishment of the best conditions of preparation and also of use. Broadly, an effective sizing agent can be taken as one with which sizing is apparent according to the standard 1 min Cobb test when the sizing agent is used at less than 1% s/f; a good rule of thumb is a Cobb value of 25 or less at 0.25% s/f or less.

According to another aspect of this invention, a method of making a paper sizing agent comprises forming a reaction product containing at least one compound of the general formulae:

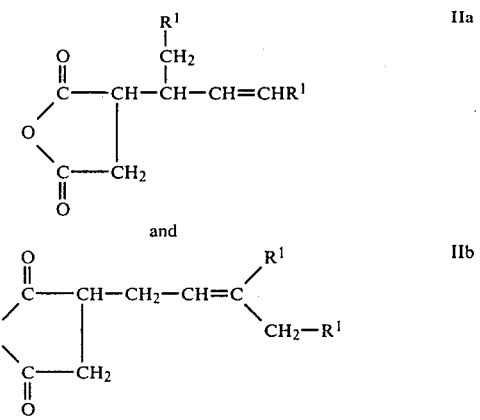

wherein each $R^1$ represents a hydrophobic group selected from alkyl, alkenyl, aralkyl or aralkenyl groups, where the $R^1$ groups in either formula may be the same or different and together they contain from 25 to 60 carbon atoms, by reacting maleic anhydride with a co-reactant selected from liquid polymers of butadiene and/or a material containing one or more of such compounds under reaction conditions involving elevated temperature while minimizing polymer formation and forming at least part of the resultant reaction product into an aqueous emulsion.

In a preferred embodiment of the invention, the maleic anhydride and the butadiene polymer co-reactant are reacted at a temperature in the range from approximately 190° to 195° C. at atmospheric pressure. A suitable reaction time is from 2 to 5 hours. The molar ratio of maleic anhydride to the polybutadiene co-reactant is preferably in the range from 0.95 to 1.5 moles of maleic anhydride per mole of co-reactant, most preferably 1.4 mole of maleic anhydride per mole of co-reactant. A solvent for the reaction product, e.g. toluene, 1,1,1-trichloroethane or other non-water-miscible solvent is advantageously employed.

Preparation of Reaction Products

The general method used involves introducing liquid polybutadiene (e.g., one or other of the "Lithene" products, as specified below), solid maleic anhydride, xylene or other solvent (where used) and antioxidant ("Polygard") into a glass reactor, fitted with a reflux condenser and stirrer, blanketed with nitrogen and held at 190°–195° C. for 2–5 hours. The reaction was monitored at intervals by examining samples for the presence of unreacted maleic anhydride. When the water-soluble acid was less than 5 mg KOH/gm, the reaction was terminated and the product was allowed to cool. It has been established that severe crosslinking and discolouration occur, if "Polygard" or another effective antioxidant is not used.

The following levels of addition of components (other than the Lithene and maleic anhydride) have been used, the amounts being % by weight of the Lithene feedstock.

Xylene 0%–5%
"Polygard" 0.5%

The products are all amber liquids having viscosities which depend on the initial amount of Lithene and the extent of the maleinisation reaction.

EXAMPLE 1

In this Example, the reaction product was made from 100 gm of Lithene PL, 9.85 gm of maleic anhydride and 3 gm of xylene, the reaction time being 4 hrs. On completion of the polybutadiene maleinisation reaction, the reaction product was recovered (mole ratio of Lithene to maleic anhydride of 1:1), emulsified with cationic starch ("Cato 102") and surface size-tested on alum-free paper. The following excellent sizing results were obtained:

| % s/f | 0.8 | 0.4 | 0.2 | 0.1 |
|---|---|---|---|---|
| 1 min Cobb gsm | 15.9 | 16.5 | 17.9 | 21.1 |

EXAMPLE 2

The reaction product was the same as that of Example 1, except that less maleic anhydride, viz. 9.1 gm, was used and the reaction time was 3 hrs. The mole ratio of Lithene to maleic anhydride was 1:0.9 and this is believed to be below the optimum range. The reaction product was emulsified with cationic starch and used for both surface-sizing on alum-free paper, with and without heat treatment, and for stock-sizing carried out under neutral conditions. The heat treatment consisted of subjecting the sized sheet to a temperature of up to 120° C. for a time sufficient to effect a measurable decrease in Cobb value, e.g. for 1 hour.

Surface Sizing

| % s/f | 1.0 | 0.5 | 0.25 | 0.125 |
|---|---|---|---|---|
| No heat treatment | 13.5 | 19 | 32 | 50 |
| With heat treatment | 9 | 14.5 | 24 | 51 |

Stock Sizing

| % s/f | 1.0 | 0.6 | 0.4 | 0.2 |
|---|---|---|---|---|
| No heat treatment | 44 | 50 | 55 | 63 |
| With heat treatment | 20.5 | 25 | 28 | 30 |

The results obtained, in comparison with Example 1 as regards surface sizing, generally indicate that the product has been made with insufficient maleic anhydride and/or has been subjected to the maleinisation reaction incompletely. This reaction product does not exhibit an adequate hydrophobic/hydrophilic balance in use and this Example indicates that a greater degree of maleinisation of the polybutadiene is almost certainly required.

EXAMPLE 3

Following the previous Examples, therefore, this Example deals with a reaction product made using the reaction conditions of Example 1, with a greater proportion of maleic anhydride, viz 11.6 gm. The molar ratio of Lithene PL to maleic anhydride was 1:1.14. The reaction product was emulsified as before and surface size-tested, giving a sizing performance which is better than Example 1:

| % s/f | 0.8 | 0.4 | 0.2 | 0.1 |
|---|---|---|---|---|
| 1 min Cobb | 13.9 | 15.6 | 15.6 | 19.2 |

The effect of increasing degrees of maleinisation was investigated, in order to determine the optimum, and it was established that the promising results of Examples 1 and 3, where more than 9.3 gm maleic anhydride is reacted per 100 gm Lithene PL, can be confirmed and improved upon.

EXAMPLE 4

The reaction product was made by the procedure outlined in Examples 1 to 3, with the exception that the amount of maleic anhydride was increased and the reaction time was decreased, to see if the proportion of the reactants was related to ease of maleinisation. 100 gm of Lithene PL were reacted with 13 gm of maleic anhydride in the presence of 3 gm of xylene for 2 hr. The molar ratio of Lithene PL to maleic anhydride was 1:1.28. The reaction product was emulsified as a 60% solution in toluene, using cationic starch as before, the toluene serving as a diluent for the viscous reaction product. The resulting emulsion was size-tested on alum-free paper, immediately after formation, and gave the following results:

| % s/f | 0.8 | 0.4 | 0.2 | 0.1 |
|---|---|---|---|---|
| 1 min Cobb | 23 | 54 | 70 | — |

The low level of sizing indicated, in comparison with Example 1, where the preparation of the reaction product and its use were otherwise identical, except for the amount of maleic anhydride and the time of reaction, indicate that an increase in maleic anhydride does not of itself yield sufficiently intense maleinisation and that a reaction time of 4 hr is an optimum figure, in other words that the minimum reaction time is above 2 hr and is at least 3 hr.

EXAMPLES 5-7

In these Examples, the preparative technique of the foregoing Examples was again used, with the following exceptions:

|  | Lithene PL | Maleic anhydride | Molar ratio | Xylene | Time |
|---|---|---|---|---|---|
| Ex.5 | 100 gm | 14 gm | 1:1.38 | 3 gm | 4 hr |
| Ex.6 | 100 gm | 19 gm | 1:1.87 | 3 gm | 4 hr |
| Ex.7 | 100 gm | 23 gm | 1:2.26 | 5 gm | 4 hr |

In each of Examples 5 to 7, the reaction products were employed as in Example 4, by being emulsified as 60% solutions in toluene with cationic starch as before. The resulting emulsions were size-tested rapidly after emulsification on alum-free paper.

| % s/f | 1.0 | 0.5 | 0.25 | 0.125 |
|---|---|---|---|---|
| Ex.5 | 11 | 12.6 | 13.8 | 17.1 |
| Ex.6 | 13.9 | 14.1 | 14.8 | 15.6 |
| Ex.7 | 15 | 18 | 18.5 | 19 |

The results of Examples 1 to 7, were Lithene PL is used as the polybutadiene in forming the reaction products, show that the optimum degree of maleinisation for effective surface sizing is about 14 gm of maleic anhydride per 100 gm Lithene, i.e. a molar ratio of about 1.4:1, but satisfactory sizing effects can be obtained with reaction products made using a molar ratio in the wider range of from 0.95:1 upwards. Selection of a product at the lower end of this range is beneficial, in that emulsification is simplified.

The following Examples 8 to 10 relate to the results obtained by extended stock-sizing evaluations using a pilot-scale paper machine. In order to further investigate the excellent results obtained by the reaction products dealt with in Examples 1 and 5, having Lithene to maleic anhydride ratios towards the lower end of the recommended range, Example 8 made use of the sizing agent of Example 1 and Examples 9 and 10 made use of a reaction product similar to the sizing agent of Example 5. These further Examples also reveal the improved results obtained after several days, indicating that the sizing agents of this invention exhibit a marked curing effect.

EXAMPLE 8

The reaction product of Example 1, when emulsified and employed as a sizing agent on a pilot machine gave the results indicated, which are given with the results achieved under identical conditions of use with "Fibran".

| % s/f | 0.3 | 0.2 | 0.1 |
|---|---|---|---|
| First test | 31 | 49 | 68 |
| Second test after 3 days' cure | 14 | 14 | 40 |
| "Fibran", first test | — | 22 | 30 |

It will be seen that the initial degree of sizing changes markedly after a relatively short period to highly acceptable levels, at sizing levels above 0.1% s/f.

EXAMPLE 9

Trials similar to those of Example 8, but including a re-test of a sample sized with "Fibran" after 3 days, were conducted, using a reaction product like the sizing agent of Example 5, but where the Lithene PL: maleic anhydride ratio is 1:1.5. The following results were obtained:

| % s/f | 0.3 | 0.2 | 0.1 | 0.05 |
|---|---|---|---|---|
| First test | 18.4 | 20 | 25 | 70 |
| Second test after 3 days' cure | 14 | 14.6 | 16.6 | 72 |
| "Fibran", first test | — | 30 | 48 | — |
| Second test after 3 days' cure | — | 13.8 | 16 | — |

EXAMPLE 10

In order to ascertain the stability under storage of the sizes of the invention, a portion each of the emulsions used in Example 9 were re-tested by use on the pilot machine, after storage at ambient temperature for a number of hours. The sizing agent of the invention gave the following results, "second test" referring to a re-test of the paper subjected to the first test:

| % s/f | 0.2 | 0.1 | 0.05 |
|---|---|---|---|
| First test after 6 hrs | 14 | 31.5 | — |
| First test after 8 hrs | — | — | 45.6 |
| Second test after 8 hrs | 14.1 | 26.3 | 48.8 |

The Cobb values compare well with the corresponding figures of 20 and 25 obtained using the emulsion substantially as soon as it had been prepared. It is thus evident that the sizing agents of the invention are satisfactorily effective, even when used after as much as 6 hrs after the preparation in emulsion form, whereas the manufacturer's recommendations for the use of "Fibran" indicate that it must be used within 2 hours of preparation. It is thus an important feature of the invention that it provides sizing agents having exceptional hydrolytic stability.

EXAMPLE 11 (i) to (iv)

A further series of tests have been conducted involving stock-sizing, to evaluate the employment of other cationic starches and retention aids. These tests gave results which are tabulated below. In these tests, the sizing agents employed were as follows:

|  | Sizing Agent | Cationic Starch | Retention Aid |
|---|---|---|---|
| Ex. 11(i) | Reaction product of Ex. 1. | Q-Tac | Kymene |
| Ex. 11(ii) | Reaction product of Ex. 3. | Cato 102 | Kymene |
| Ex. 11(iii) | Reaction product of Ex. 5. | Q-Tac | Kymene |
| Ex. 11(iv) | Reaction product of Ex. 6. | Cato 102 | Nil |

The following cobb values were obtained:

| % s/f | 1.0 | 0.8 | 0.6 | 0.4 | 0.2 |
|---|---|---|---|---|---|
| Ex.11(i) | — | — | 20 | — | 40 |
| Ex.11(ii) | — | — | 16 | — | 33 |
| Ex.11(iii) | — | — | 15 | — | 18 |
| Ex.11(iv) | 19 | — | 20 | 22 | 46 |

Examples 1 to 10 are based upon the use of Lithene PL as the polybutadiene; the following additional Examples are based upon the use of other Lithenes.

EXAMPLES 12 TO 14

Preparation of Reaction Products

The liquid polybutadiene identified as "Lithene PM" was reacted with maleic anhydride, using an antioxidant and xylene as a solvent. The general reaction technique was as indicated in Example 1. The amounts and reaction conditions used are tabulated below:

| Example | Lithene PM | Maleic Anhydride | Molar Ratio | Solvent |
|---|---|---|---|---|
| 12 | 100gm | 7.1gm | 1:0.9 | Xylene |
| 13 | 100gm | 10.1gm | 1:1.3 | Xylene |
| 14 | 100gm | 20gm | 1:2.55 | Xylene |

Performance of Products

| % s/f | 1.0 | 0.5 | 0.25 | 0.125 |
|---|---|---|---|---|
| Ex 12, no heat treatment | 15 | 15 | 17 | 34 |
| Ex 12, with heat treatment | 15 | 15 | 27 | 48 |

| % s/f | 1.0 | 0.5 | 0.25 | 0.125 |
|---|---|---|---|---|
| Ex 13, no heat treatment | 14 | 16 | 24 | 35 |
| Ex 13, with heat treatment | 12 | 15 | 22 | 39 |

| % s/f | 1.0 | 0.5 | 0.25 | 0.125 |
|---|---|---|---|---|
| Ex 14, sheet acetone-extracted | 15.3 | 16.3 | 18.8 | — |
| Ex 14, no treatment of sheet | 14.6 | 17.6 | 20.7 | — |
| Ex 14, with heat-treatment | 14 | 16 | 21 | 35 |

These results show that reaction products comprising maleinised Lithene PM made excellent paper sizing agents and that, like other Lithenes, the maleinisation can be performed readily at ambient pressure.

EXAMPLE 15

The preparative procedure of the foregoing Examples was followed, using 10.9 parts of maleic anhydride and 100 parts of "Lithene AL" polymer. The mole ratio of Lithene to maleic anhydride is thus 1:1, as in Ex. 1. The performance of the product when dissolved in toluene, emulsified with cationic starch and used for surface sizing was as follows:

| % s/f | 1.0 | 0.5 | 0.25 | 0.125 |
|---|---|---|---|---|
| No heat treatment | 18 | 30 | 56 | 66 |
| With heat treatment | 14 | 30 | 59 | 64 |

EXAMPLE 16

4.941 parts of maleic anhydride were reacted with 100 parts of "Lithene N5000" polymer as before. This Lithene has a high molecular weight (5400) and gives satisfactory sizing, but is relatively expensive. The molar ratio was 1:2.7. The reaction product was dissolved in toluene and emulsified with cationic starch. The following surface sizing results were obtained:

| % s/f | 1.0 | 0.5 | 0.25 | 0.125 |
|---|---|---|---|---|
| Ex 16 | 17 | 17 | 18 | 28 |

EXAMPLE 17

Lithene PM 25 MA

This product has been made up into an emulsified sizing agent using a cationic starch and a solvent (toluene), as with the maleinised polybutadiene reaction products of the preceding Examples. The following sizing results have been obtained:

Surface Sizing

| 1% | 0.5 | 0.25 | 0.125 |
|---|---|---|---|
| 14 | 17.6 | 20.7 | — |

Stock Sizing

|  | 1% | 0.6 | 0.4 | 0.2 |
|---|---|---|---|---|
| No heat treatment | 22.7 | 27.3 | 38.9 | 55 |
| With heat treatment | 14.5 | 17 | 26 | 22 |

General Indications of Sizing Data

All the size test evaluations of the Examples 1 to 4 above are to be compared with standard results obtained with "Fibran" (National Starch).

|  | 1.0 | 0.5 | 0.25 | 0.125 |
|---|---|---|---|---|
| Surface sizing | 21 | 19 | 18.5 | 17.5 |

|  | 1.0 | 0.6 | 0.4 | 0.2 |
|---|---|---|---|---|
| Stock sizing | 17.5 | 19.7 | 20 | 27 |

It can be seen from the large number of results obtained by surface sizing that the reaction products made by treatment of Lithenes with maleic anhydride are comparable with "Fibran" as a surface size and that no special conditions are required to develop sizing.

Further, if alum-free paper is treated with different amounts of Lithene/MA reaction product and allowed to air dry the following 1 min Cobb results are obtained:

| % size/fiber | 1.0 | 0.5 | 0.25 | 0.125 |
|---|---|---|---|---|
| "Lithene"/MA Product | 18 | 20 | 20.5 | 25.1 |
| "Fibran" | 37 | 27 | 22 | 24.7 |

This shows that the Lithene/MA products of the present invention are readily reactive with cellulose, since extraction of the sheets with acetone fails to destroy sizing.

Surface sizing carried out in the normal manner (dried sheets) is not destroyed by solvent extraction.

There is no indication that materials are present in the reaction products contributing a negative factor towards sizing. All sizing tests show a direct relationship to the amount of size applied.

The chemical products formed by reaction of "Lithenes" and maleic anhydride are, in general, mixtures of long chain succinic anhydrides, one major distinguishing feature being the length of the carbon chains involved. The materials appear to act as reactive sizing agents, at similar levels of addition to both "Fibran" and ketene dimer sizes, but have average carbon chain lengths about three times as long. The maleinized polybutadienes may be used according to the present invention for the sizing of paper prepared from all types of cellulosic fibres and combinations of cellulosic with non-cellulosic fibres. The cellulosic fibres which may be used include bleached and unbleached sulphate (kraft), bleached and unbleached sulphite, bleached and unbleached soda, neutral sulphite, semi-chemical chemigroundwood, ground wood, and any combination of these fibres. These designations refer to wood pulp fibres which have been prepared by means of a variety of processes which are used in the pulp and paper industry. In addition, synthetic fibres of the regenerated cellulose type, e.g. Viscose rayon, can also be used.

According to a preferred feature of this invention, considerable importance as regards sizing efficiency attaches to the selection of an organic solvent in conjunction with sizing. A preferred solvent is one which is water-immiscible and is satisfactory in use from a variety of practical standpoints, not only as regards freedom from environmental pollution problems, but also as regards presenting a low-risk hazard as to flammability. A preferred solvent from these standpoints and other practical considerations including sizing performance is 1,1,1-trichlorethane. Other individual solvents may be preferable as regards one or more specific considerations, such as "Isopar M", methyl oleate, trichloroethylene, acetone, white spirit, printing ink distillates and paraffin (or kerosene) fractions. These solvents are utilisable in carrying out the invention and, while 1,1,1-trichlorethane does not exhibit certain beneficial properties to the same advantageous extent as some other individual materials, it is the most preferred solvent when consideration is given to all relevant factors. To be suitable, any solvent must give a reasonable combination of properties and, especially, boiling point and polarity. Another important property determining the suitability of a solvent is its effect with time on the hydrolytic stability of a sizing agent. Any solvent, to be usable, must not be capable of reacting with anhydride groups, nor itself be miscible with water or aqueous media.

In order to demonstrate the effect of various solvents upon sizing efficiency, a number were used in various amounts, with a sizing agent made from 375 parts by weight of a 20% aqueous "Fixanol" solution, 80 parts by weight of water, 41.6 parts by weight of maleinised polybutadiene sizing agent and (instead of cationic starch as an emulsification aid) 3.0 parts by weight of a dicyandiamide-formaldehyde condensate (1:1 "Ethylan" DP/20). The mixture was emulsified by intensive agitation for 5 minutes and, at 0.6% s/f, gave a 1 min Cobb value of 29. Using 10 g of this size and 15 g of starch, with the following solvents, the indicated Cobb values were obtained:

| Solvent | Concentration (%) (by volume) | Cobb Value % S/F 0.6 | 0.2 |
|---|---|---|---|
| "Isopar M" | 60 | 19 | 32 |
| "Isopar M" | 70 | 23 | 51 |
| "Isopar M" | 75 | 25 | 54 |
| Methyl oleate | 70 | 20 | 41 |
| Trichloroethylene | 70 | 25 | 60 |
| Acetone | 70 | 51 | 61 |
| White Spirit | 60 | 20 | 40 |
| PID 220/240* | 60 | 20 | 50 |
| PID 230/260* | 60 | 21 | 39 |
| PID 240/260* | 60 | 18 | 51 |
| PID 260/290* | 60 | 16 | 40 |
| PID 290/315* | 60 | 18 | 44 |
| Exsol 200/240$^\phi$ | 60 | 16 | 27 |
| 1,1,1 Trichloroethane | 60 | 19 | 25 |

*Printing ink distillate (diesel oil fraction); the figures indicate boiling range in °F.
$^\phi$Paraffin (kerosene) cut.

EXAMPLE 18

Other examples have further tested the use of dicyandiamide-formaldehyde (mentioned above as an alternative to cationic starch). The following sizing agents were prepared; the amounts stated are by weight:

|  | A | B |
|---|---|---|
| 20% aq. "Fixanol" solution | 375 | 100 |
| Water | 80 | 383.4 |
| Sizing agent | 41.6 | 16.6 |
| "Ethylan" DP/20 (1:1) | 3.0 | 3.0 |

Emulsion A contained 5% total solids and was made by circulating it for 5 minutes under intensive agitation in a high-speed mixer at 1000 psi. Emulsion B contained 2% total solids and was made by circulating it for 5 minutes under intensive agitation, but without the use of elevated pressure. The following results were obtained by stock sizing:

Ex. 18 A

| Amount of emulsion | 1 min Cobb - gsm |
|---|---|
| 0.6% S/F | 29 |
| 0.2% S/F | 57 |

Ex. 18 B

| Amount of emulsion | 1 min Cobb - gsm |
|---|---|
| 0.6% S/F | 19 |
| 0.2% S/F | 56 |

EXAMPLE 19

To illustrate the use of carboxymethylcellulose (CMC) in place of cationic starch or other emulsification aids, three sizing agent emulsions were made up and tested.

| Emulsion: | A | B | C |
|---|---|---|---|
| 1% aq. CMC (g) | 150 | 300 | 450 |
| Sizing agent (e.g. "Lithene"/MA adduct) | 16.6 | 16.6 | 16.6 |
| Water | 333.3 | 183.3 | 533.3 |
| Total solids | 2% | 2% | 1% |

The following results were obtained by surface sizing:

Ex. 19

|  | 1 min Cobb - gsm |
|---|---|
| Emulsion A - 0.1% S/F | 29 |
| Emulsion B - 0.1% S/F | 23 |
| Emulsion C - 0.1% S/F | 18 |

These results show clearly the satisfactory sizing performance obtainable with the wide variety of polybutadiene/maleic anhydride reaction products according to this invention. One feature of sizing agents of this kind is that often they demonstrate a development of sizing effect with time, so that there may be a slow-curing effect evinced by development of the full sizing action as much as 24 hours after removal of the paper from the machine. Another advantageous property of the sizing agents of this invention is their excellent hydrolytic stability. For instance, when paper is made by stock sizing with 0.4% s/f "Fibran", a 1 min Cobb value in the range of 0-6 is obtained when the paper is made up to 4 hours after preparation of the sizing agent; over this time, the "Fibran" emulsion rapidly loses stability, so that typical Cobb values under otherwise similar conditions are 20-25 after 6 hrs, 25-35 after 8 hrs and 50-60 after 10 hrs. Under comparable conditions, the above-mentioned Size A of Ex. 18, for instance, gives a Cobb value of up to 10 after 8 hrs, a value which is still obtained after 12 hrs, whereafter there is a gradual increase in Cobb value, indicating a gradual deterioration of the prepared size with time, but so that satisfactory Cobb values of 20-25 are still given after 15 hrs, Cobb values being typically 25-35, after 17-18 hrs and 50 to 60 after 20-24 hours. This means in effect that size preparation can be carried out no more than once daily, instead of about once every 4-6 hours.

The sizing agents impart to paper good resistance to acidic liquids, for example acid inks, citric acid and lactic acid, as compared with paper sized with known sizing agents. In addition to the properties already mentioned, these sizing agents may be employed to give effective sizing in alkaline conditions. This is a highly desirable advantage, as it allows cheap alkaline fillers, e.g. chalk (calcium carbonate) to be used to fill papers.

Also, the sizing agents of the invention do not detract from the strength of the paper and can, in fact, increase the strength of the finished sheets. Only mild drying or curing conditions are normally required to develop full sizing value.

The use of the sizing agents in the manufacture of paper may involve a number of variations in technique any of which may be further modified in light of specific requirements. It is most important to achieve uniform dispersal of the sizing agent throughout the fiber slurry, its addition to the pulp thus involving vigorous agitation. Uniform dispersal may also be obtained by adding the sizing agent in a fully dispersed form, such as an emulsion, or by the co-addition of chemical dispersing agents to the fibre slurry.

All types of pigments and fillers may be added to the paper which is to be sized by the present method. Such materials include clay, talc, titanium dioxide, calcium carbonate, calcium sulphate, and diatomaceous earths. Other additives, including alum, as well as other sizing agents, can also be used with these sizing agents.

According to a preferred feature of the present invention, the reactive sizing agents are employed in amounts in the range from 0.05% to 3.0% of the dry weight of the pulp. A cationic starch is preferred as an emulsifying agent for making the reactive sizing agent and it is preferably employed in an amount in the range from 0.5 to 2.0 parts (preferably 1.5) by weight of cationic starch per part of sizing agent. The amount of starch thus typically equals 1½ times the weight of the sizing agent. Where the amount of the latter is 1.0% s/f, therefore, the sizing agent in fact also contains 1½ times that amount of starch, e.g. "Cato 102", to make the reactive emulsion actually used as the sizing agent. Another important factor in the use of the sizing agents of the invention is the use of retention aids, though it can be said that the cationic starch required to maintain the reaction product in a stable emulsion form so that it can be stored and used as required may also operate in the manner of a retention aid. These retention aids, like the starch, either are cationic or are capable of ionizing or dissociating in such a manner as to produce cations or other positively-charged entities. These cationic agents or retention aids have been found useful for bringing the sizing agents into close proximity with the pulp. Materials which may be employed as cationic agents include alum, aluminium chloride, long chain fatty amines having at least 8 carbon atoms in the chain, sodium aluminate (which in acid solution generates alum), cationic-substituted polyacrylamides, chromic sulphate, animal glue, dicyandiamide/formaldehyde condensates, cationic thermosetting resins and cationic polyamide polymers. Particularly interesting cationic starch derivatives include primary, secondary, tertiary and quaternary amine starch derivatives and other cationic nitrogen-substituted starch derivatives, as well as cationic sulphonium and phosphonium starch derivatives. Such derivatives can be prepared from all types of starches including those derived from corn, tapioca, potato, waxy maize, wheat and rice. Moreover, they may be in their original granule form or they may be converted into pregelatinized, cold-water-soluble products. Moreover, the most promising cationic retention aids, in conjunction with reaction products of maleic anhydride and polybutadienes, are polyacrylamides, dicyandiamide/formaldehyde condensates and cationic polyamide polymers. These retention aids cannot entirely replace cationic starches as emulsifying agents because of the colloid-forming characteristics of the latter.

Any of the above-noted cationic aids and agents may be added to the stock, i.e. the pulp slurry, either prior to, along with or after the addition of the sizing agent. However, in order to achieve maximum distribution, it is preferable to add the cationic agent either subsequent to or in direct combination with the sizing agent. The actual addition to the stock of either the cationic agent or the sizing agent may take place at any point in the paper-making process prior to the ultimate conversion of the wet pulp into a dry web or sheet. Thus, for example, these sizing agents may be added to the pulp while the latter is in the headbox, beater, hydropulper or stock chest.

In order to obtain good sizing, it is desirable for the sizing agents to be uniformly dispersed throughout the fibre slurry in as small a particle size as possible. One method for accomplishing this is to emulsify the sizing agent prior to its addition to the stock utilizing mechanical means, e.g. high speed agitators or mechanical homogenizers, or by the addition of suitable emulsifying agents. Where possible, it is highly desirable to employ the cationic agent as the emulsifier and this procedure is particularly successful where cationic starch derivatives are concerned. Non-cationic emulsifiers which may be used as emulsifying agents for the sizing agents include hydro-colloids, e.g. ordinary starches, non-cationic starch derivatives, dextrines, carboxymethyl cellulose, gum arabic, gelatin and polyvinyl alcohol. Examples of usable surfactants include polyoxyethylene sorbitan trioleate, polyoxyethylene sorbitol hexaoleate, polyoxyethylene sorbitol laurate, and polyoxyethylene sorbitol oleate-laurate. When such noncationic emulsifiers are used, it is often desirable to separately add a cationic agent to the pulp slurry after the addition to the latter of the emulsified sizing agent. In preparing these emulsions with the use of an emulsifier, the latter is usually first dispersed in water and the sizing agent is then introduced, with vigorous agitation.

As shown by the above examples, the novel sizing agent of the invention can be used for sizing preformed sheets; the products can also be used as internal sizes by mixing the products with an aqueous slurry of pulp, as also is illustrated by the above examples. In general, the sizing agents of this invention can be used in any of the known methods for sizing paper, including application at the size press or a coating apparatus, whether under alkaline, neutral or even slightly acid conditions.

It should also be understood that although it is preferred to use the sizing agent as the sole size, it can be used in conjunction with or in admixture with conventional reactive sizes and non-reactive sizes, such as rosin size, if desired, without departing from the scope of the invention. It will be clear to those skilled in the paper sizing art, however, that any undesirable interaction which might occur between a size according to the invention and another size used with it should be avoided.

What is claimed is:

1. A method of sizing paper, which comprises dispersing within wet paper pulp, or, after conversion of such pulp into paper treating the resultant web with, a sizing agent which comprises an emulsion in an aqueous medium containing at least one compound selected from the group consisting of long-chain succinic anhydride derivatives prepared from maleic anhydride and a polymer of butadiene in the presence of an antioxidant and having the general formulae:

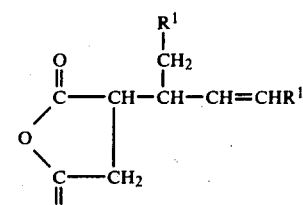

and

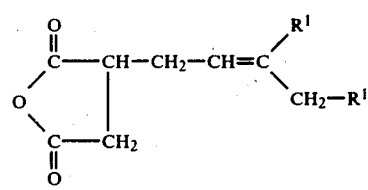

wherein each $R^1$ represents a hydrophobic alkenyl group, where the $R^1$ groups in either formula may be the same or different and together they contain from 25 to 60 carbon atoms.

2. A method according to claim 1, wherein the long-chain succinic anhydride derivative is prepared from maleic anhydride and a polymer of butadiene having a molecular weight in the range from about 500 to about 10,000.

3. A method according to claim 2, wherein the long-chain succinic anhydride derivative is prepared from maleic anhydride and a polymer of butadiene having a molecular weight in the range of from about 750 to about 1500.

4. A method according to claim 1, wherein the long-chain succinic anhydride derivative has a molecular weight in the range of from about 800 to about 1400.

5. A method according to claim 1, wherein the sizing agent comprises an emulsion of the reaction product of maleic anhydride and a liquid polymer of butadiene.

6. A method according to claim 5, wherein the reaction product is made from the butadiene polymer and maleic anhydride in a molar ratio in the range from 1:0.95 upwards.

7. A method according to claim 6, wherein the molar ratio of butadiene polymer to maleic anhydride in the reaction product is in the range from 1:0.95 to 1:1.5.

8. A method according to claim 1, wherein the sizing agent also comprises a water-immiscible solvent.

9. A method according to claim 8, wherein the water-immiscible solvent is 1,1,1-trichloroethane.

10. A method according to claim 1, wherein the paper pulp or a web derived therefrom is additionally treated with another reactive size or a non-reactive size.

11. A method according to claim 1, wherein the sizing agent also comprises at least one cationic and/or non-cationic emulsifying agent.

12. A method according to claim 1, wherein the sizing agent is employed in an amount in the range of from about 0.05% to about 3.0% by weight of succinic anhydride derivative based on the dry weight of the pulp.

13. A method according to claim 12, wherein the amount of succinic anhydride derivative is in the range of from about 1.0% to about 2.5% by weight, basis dry weight of the pulp.

14. A method according to claim 11, wherein the emulsifying agent comprises a cationic starch, carboxymethylcellulose or dicyandiamide-formaldehyde condensate employed in an amount in the range of from about 0.5 to about 2.0 parts by weight per part by weight of succinic anhydride derivative.

15. A method according to claim 14, wherein the amount of cationic starch is about 1.5 parts by weight per part of succinic anhydride derivative.

16. A method according to claim 11, wherein a retention aid selected from alum, aluminium chloride, long chain fatty amines, sodium aluminate, cationic-substituted polyacrylamides, chromic sulphate, animal glue, dicyandiamide/formaldehyde condensates, cationic thermosetting resins and cationic polyamide polymers is employed in conjunction with the sizing operation.

17. A method according to claim 1, wherein the resultant sized sheet is subjected to either or both a size curing step or a heat treatment step.

18. A method according to claim 17, wherein the sized sheets are heated to a temperature of up to 120° C. for a time sufficient to effect a measurable decrease in Cobb value as compared with the non-heat-treated paper web.

19. A method according to claim 1, wherein the sizing agent is admixed with paper pulp under conditions involving vigorous agitation sufficient to effect uniform dispersal of the sizing agent throughout the slurry of paper fibre.

20. Paper as herein defined, when made or sized by the method according to claim 1.

21. A paper sizing agent having improved hydrolytic stability which comprises an aqueous emulsion of at least one compound selected from the group consisting of long-chain succinic anhydride derivatives prepared from maleic anhydride and a polymer of butadiene in the presence of an antioxidant and having the general formulae:

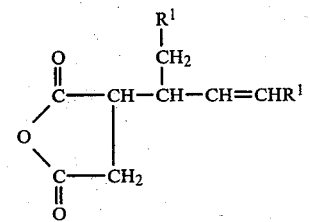

and

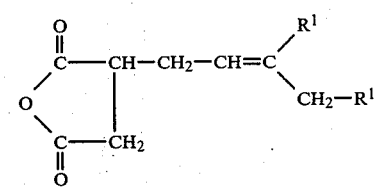

wherein each $R^1$ represents a hydrophobic alkenyl group, where the $R^1$ groups in either formula may be the same or different and together they contain from 25 to 60 carbon atoms.

22. A paper sizing agent according to claim 21, wherein the long-chain succinic anhydride derivative is the reaction product of maleic anhydride and a polymer of butadiene having a molecular weight in the range of from about 500 to about 10,000.

23. A paper sizing agent according to claim 22, wherein the polymer of butadiene has a molecular weight in the range of from about 750 to about 1500.

24. A paper sizing agent according to claim 21, wherein the long-chain succinic anhydride derivative has a molecular weight in the range of from about 800 to about 1400.

25. A paper sizing agent according to claim 21, wherein the long-chain succinic anhydride derivative is the reaction product of maleic anhydride and a liquid polymer of butadiene.

26. A paper sizing agent according to claim 21, which also comprises a water-immiscible solvent.

27. A paper sizing agent according to claim 26, wherein the water-immiscible solvent is 1,1,1-trichloroethane.

28. A paper sizing agent according to claim 21, which also comprises from about 0.5 to about 2.0 parts by weight per part by weight of succinic anhydride derivative of an emulsifier selected from the group consisting of cationic starch, carboxymethylcellulose and dicyandiamide-formaldehyde condensates.

29. A paper sizing agent according to claim 28, wherein the emulsifier is about 1.5 parts by weight of cationic starch.

* * * * *